O. F. ORNDOFF.
FURROW OPENER ATTACHMENT.
APPLICATION FILED MAY 31, 1911.

1,050,681.

Patented Jan. 14, 1913.

Witnesses:

Inventor
Oscar F. Orndoff
By
Attys

UNITED STATES PATENT OFFICE.

OSCAR F. ORNDOFF, OF COUNCIL BLUFFS, IOWA.

FURROW-OPENER ATTACHMENT.

1,050,681.  Specification of Letters Patent.  Patented Jan. 14, 1913.

Original application filed November 11, 1908, Serial No. 462,073. Divided and this application filed May 31, 1911. Serial No. 630,436.

*To all whom it may concern:*

Be it known that I, OSCAR F. ORNDOFF, a citizen of the United States, residing at Council Bluffs, in the county of Pottawattamie and State of Iowa, have invented certain new and useful Improvements in Furrow-Opener Attachments, of which the following is a specification.

This application is a division of my application Serial No. 462,073 filed in the United States Patent Office on or about November 11, 1908, and the present invention relates to improvements in furrow opener attachments particularly adapted for use on corn planters or other seeding machines, and one of the objects of the invention is to provide an improved means whereby the furrow opener may be readily attached or secured to the seed tube to properly position the opener with respect to the shoe or furrow opener.

A further object is to provide an improved device of this character having means whereby the furrow opener may be readily positioned or adjusted with respect to the seed distributing tube and the ground.

A further object is to provide an improved sectional device of this character which may be readily attached either to the seed tube or to the braces or supporting structure for the shoe or tube, whereby the presence of the braces or structure will not interfere with the proper attachment of the furrow opener.

A further object is to provide an improved device of this class, which will be simple, durable and cheap in construction and effective and efficient in operation.

To the attainment of these ends and the accomplishment of other new and useful objects, as will appear, the invention consists in the features of novelty in substantially the construction, combination and arrangement of the several parts hereinafter more fully described and claimed and shown in the accompanying drawings illustrating an embodiment of the invention, and in which—

Figure 1:
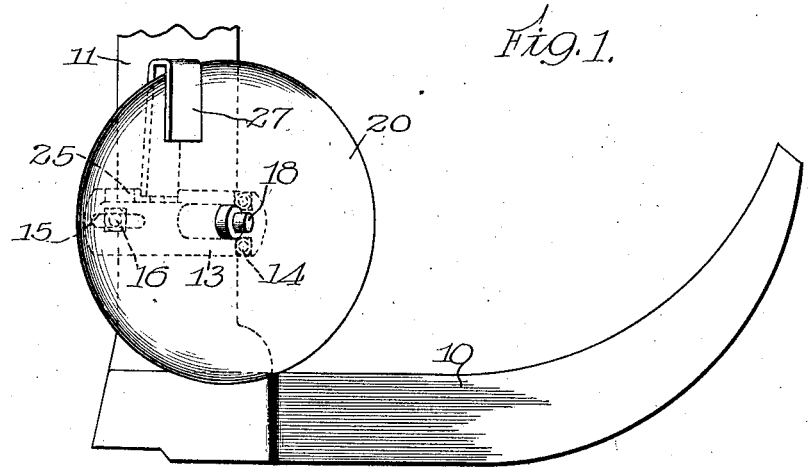
Figure 2:
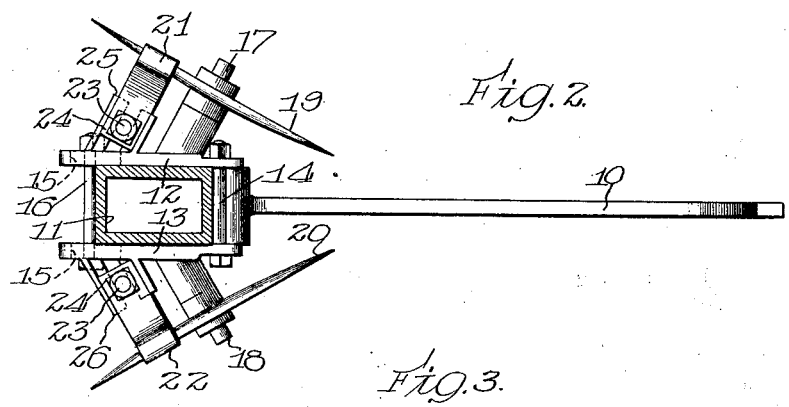
Figure 3:
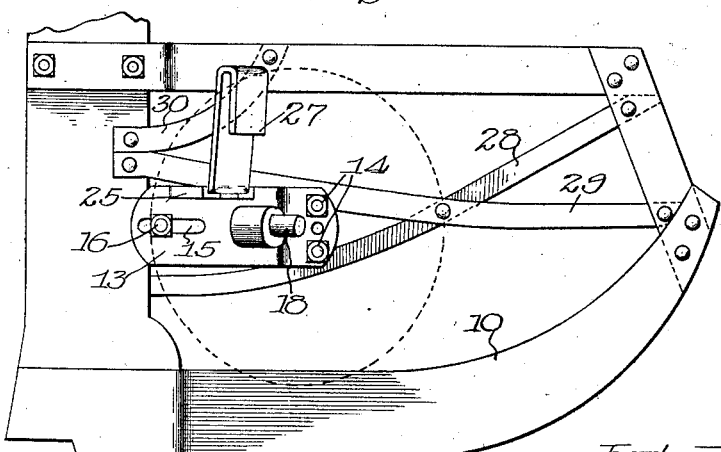

Figure 1 is a side elevation of an improved attachment of this character, constructed in accordance with the principles of this invention and showing the furrow opener attached directly to a seed tube. Fig. 2 is a top plan view of Fig. 1 showing the seed tube in section. Fig. 3 is a side elevation similar to Fig. 1 showing the manner in which the furrow opener may be attached to the construction of machines employing braces for the shoe.

Referring more particularly to the drawings and in the present exemplification of the invention, the numeral 10 designates the ordinary form of shoe of a planter and 11 designates the seed distributing tube. In the present exemplification of the invention the seed tube is shown as being rectangular in cross section although in many forms of machines to which the present attachment is adapted to be secured, the shape of the tube varies.

In the preferred form of attachment, there are provided two members 12 and 13, preferably in the form of beveled pillow blocks which are similar in configuration and may be of any desired width but preferably of a width to form extended bearings against the face of the seed tube. These members or pillow blocks constitute flanged clamping plates which may be of any desired length but are preferably of a length somewhat greater than the width of the seed tube. One extremity of each of said plates or blocks is preferably provided with a plurality of apertures through which suitable fastening devices 14, such as bolts or the like, are adapted to pass when the members 12 and 13 are arranged opposite to each other and on opposite sides of the seed tube. The other extremity of each of the clamping plates 12, 13 are provided with elongated slots 15, through which a suitable fastening device 16, such as a bolt or the like, is adapted to pass for clamping the members 12, 13 to the seed tube. The slots 15 in the members are provided to permit the fastening bolt 16 to be adjusted longitudinally with respect to the members 12, 13 to permit the attachment to be secured to seed tubes of varying sizes. Each of said clamping plates with the connecting bolts 14, 16 constitute means for rigidly mounting the oppositely arranged pillow blocks on the seed tube 11.

Projecting respectively from the outer face of each of the members 12, 13, when the latter are secured in position, are stub axles 17, 18, which in the present exemplification of the invention are integral with the respective members 12, 13 and journaled upon these axles 17, 18 are furrow opener disks 19, 20. The axles 17, 18 are arranged at an angle to the face of the respective members 12, 13 and so disposed that when the disks are journaled thereto, the latter will form an acute angle with one another toward the front or forward part of the shoe 10 thereby causing the disks to diverge toward the rear of the shoe for the obvious purpose as is well known in the art, to cause the furrow to be widened in a gradual manner. These disks 19, 20 may be held against displacement with respect to their axles in any desired or suitable manner. For this purpose the scrapers 21, 22 may be utilized and the scrapers are adjustably held or secured to their respective supporting members 12, 13 preferably by means of fastening devices 23 which project through an angular portion 24 of the scraper and through slotted projections 25, 26 on the respective members 12, 13. These slotted projecting portions 25, 26 are located preferably to the rear of the axles.

The body portions of the scrapers project upwardly toward the top of the furrow opener disks and the extremity 27 of the scrapers are bent back upon the body portion and spaced therefrom to form a hook-shaped portion extending over the peripheries of the respective disks so as to engage and rest against the outer faces thereof. This extremity 27 serves as a scraper and also as a means for preventing the disks from being moved or shifted longitudinally on the stub axles and thereby holds the disks against accidental displacement.

With this improved form of attachment it will be manifest that the furrow disks may be adjusted upwardly or downwardly upon the seed tube and to the desired position, in which position they may be secured by tightening the fastening members or bolts 14 and 16.

As shown in Fig. 3, there are provided braces 28, 29, 30, the braces 28, 29 crossing each other in the space between the seed tube and the point of the shoe 10. With this construction of planter, it will be manifest that by providing the clamping members 12, 13 which are separate from each other, the furrow openers may be secured to the braces 28, 29 which braces would interfere with the attachment to the seed tube of furrow openers otherwise constructed, but by the provision of the sectional clamp it will be manifest that one of the members 12, 13 may be placed on each side of the braces 28, 29, as shown, and the fastening bolts 14 are fastened through the registering apertures in one extremity of the members 12, 13, which extremities are arranged to engage opposite faces of the braces. The other extremity of the members 12, 13 may be arranged to engage opposite faces of the seed tube 11 adjacent the forward end thereof and the fastening device 16 may be passed through the registering slots 15 at a point beyond the forward edge of the seed tube, so that when the fastening devices 14, 16 are tightened, the supporting members 12, 13 will be securely held in position and may be adjusted vertically in the same manner in which the attachment may be adjusted when secured directly to the seed tube.

In the event that a portion of the space between the braces, through which space the forward fastening devices 14 project, is not sufficient to permit an extended adjustment of the members 12, 13 when all of the fastening devices 14 are used, one of the fastening devices may be omitted. With this improved construction it will be manifest that the furrow openers may be readily attached or detached when desired to or from any form of planting machine and when so attached may be readily adjusted so as to position the furrow openers with respect to the shoe or furrow opener of the planting machine. Furthermore, by providing clamping members, which are of some width, they will form extended bearings against the supporting surface and will thereby overcome all thrust of the disks. This construction will also permit the disks to be adjusted upon the support to any desired extent with respect to the shoe or runner 10 of the planter so that the upper portion of the opening or furrow made by the shoe and the disks will be of much greater width than the bottom portion of the furrow. This particular form of furrow permits the seed to be deposited into the bottom of the furrow below the enlarged upper portion and to be covered, while at the same time the furrow will not be entirely filled by the soil used in the first covering of the seed.

It is well known that the roots of the stalk or stem, and corn in particular, sprout therefrom at or near the surface of the ground and for this reason "hilling" is necessary in the cultivation of the corn to keep the roots covered. In the ordinary manner of planting corn the surface of the ground is left practically level when the corn is first planted and when the corn is "hilled" these hills extend above the surface of the ground, and are not sufficiently large to increase to any great extent the hold of the roots in the ground. With the present invention the top of the furrow opening is considerably larger than the bottom and the disks are adjustable so that they may run the desired distance above the point at which the seed is deposited and covered by the planting device and only enough soil is deposited in the furrow to cover the seed. This will leave a furrow opening above the surface of the covering of the seed.

When the seeds sprout and the roots of the plant or stalk come near or above the surface of the soil in the enlarged portion of the furrow, they may be covered by depositing more soil in the enlarged portion of the furrow, thereby causing the stalks to have a firm and secure hold in the ground and below the surface thereof, which is not the case with corn as now planted.

What is claimed as new is—

1. A disk bearing block having a laterally and forwardly extending stub and having a vertical series of fastening holes at one end and a longitudinal slot at the other end.

2. A disk bearing block having a laterally and forwardly extending stub and having a series of fastening holes at one end arranged one above the other and extending above the axle and a fastening aperture at the other end.

3. A disk bearing block having a laterally and forwardly extending stub forming a disk journal, said block having a series of upright fastening holes at one end, and a fastening aperture at the other end, in combination with fastening means passing through one of the holes and the aperture to secure the parts to a planter.

4. A disk bearing block having a laterally and forwardly extending stub forming a disk journal, said block having a series of upright fastening holes at one end extending above the stub, and a fastening aperture at the other end, in combination with fastening means passing through one of the holes and the aperture to secure the parts to a planter.

5. A disk bearing block having a laterally and forwardly extending stub supporting a disk journal, said block having a slotted fastening hole at one end, and a fastening aperture at the other end, in combination with fastening means passing through the said hole and the aperture to secure the parts to a planter.

6. In combination with the seed tube and the shoe or furrow opener of a planting machine, a pillow block mounted in contact with the tube, said pillow block carrying a forwardly and laterally extending stub and axle and extending itself forwardly and rearwardly of the tube, fastening means at the front vertically adjustable, fastening means at the rear longitudinally adjustable, and a disk carried by said axle.

7. A disk bearing block having a forwardly and laterally extending stub and axle extending from one side of the block only, the block extending itself forwardly and rearwardly of the said stub, a fastening hole being provided in one end and a slotted fastening aperture in the other end of the said block, in combination with fastening means passing through the said hole and through the said aperture to secure the block to a planter.

In testimony whereof I have signed my name to this specification, in the presence of two subscribing witnesses, on this 26" day of May, A. D. 1911.

OSCAR F. ORNDOFF.

Witnesses:
E. G. REWELL,
F. W. SPETMAN.

---

Copies of this patent may be obtained for five cents each, by addressing the "Commissioner of Patents, Washington, D. C."